United States Patent [19]

Tanaka

[11] Patent Number: 5,106,206
[45] Date of Patent: Apr. 21, 1992

[54] LINEAR MOTION GUIDE UNIT MANUFACTURED FROM A RESIN

[75] Inventor: Kazuhiko Tanaka, Fuchu, Japan

[73] Assignee: Nippon Thompson Co., Ltd., Tokyo, Japan

[21] Appl. No.: 647,864

[22] Filed: Jan. 30, 1991

[51] Int. Cl.⁵ .............................................. F16C 29/06
[52] U.S. Cl. ..................................................... 384/45
[58] Field of Search ........................ 384/45, 43, 44, 49, 384/55; 464/168

[56] References Cited

U.S. PATENT DOCUMENTS

| | | | |
|---|---|---|---|
| 4,717,264 | 1/1988 | Walter et al. | 384/45 |
| 4,806,022 | 2/1989 | Takahiro | 384/45 |
| 4,886,374 | 12/1989 | Osawa | 384/45 |
| 4,989,996 | 2/1991 | Binder et al. | 384/43 |

Primary Examiner—Lenard A. Footland
Attorney, Agent, or Firm—Skjerven, Morrill, MacPherson, Franklin & Friel

[57] ABSTRACT

A linear motion guide unit includes a rail, slider slidably mounted on the rail and a plurality of rolling members interposed between the rail and the slider to provide a rolling contact between the rail and the slider. At least one of these components comprising the linear motion guide unit is comprised of a resin material, in particular engineering plastic material. For example, the rail is comprised of an engineering plastic material and has a pair of opposite side surfaces on each of which a guide groove is formed. A plurality of vertical grooves are formed on the surface spaced apart from each other along the guide groove. The provision of such vertical grooves allow to absorb any errors in the mounting accuracy so that the rail can be manufactured from a resin material, which in turn contributes to provide an extremely light-weight linear motion guide unit.

14 Claims, 4 Drawing Sheets

LINEAR MOTION GUIDE UNIT MANUFACTURED FROM A RESIN

BACKGROUND OF THE INVENTION

1. Field of the Invention

This invention generally relates to a linear motion guide unit, and, in particular, to a linear motion guide unit manufactured from a resin at least partly.

2. Description of the Prior Art

A linear motion guide unit is well known and it generally includes a rail extending straight over a desired length, a slider which is slidably mounted on the rail and a plurality of rolling members interposed between the rail and the slider to thereby provide a rolling contact between the slider and the rail. Such a linear motion guide unit has a wide range of applications.

Typically, such a linear motion guide unit is manufactured from steel or a sheet metal partly because of the required structural strength. However, in some applications, the weight of such a linear motion guide unit plays a predominant role and thus it is not uncommon that such a linear motion guide unit is required to be very light in weight. In addition, as the range of applications expand, the size of such a linear motion guide unit is often desired to be very small.

In order to meet such requirements, it is often desired to manufacture such a linear motion guide unit from a resin material. However, partly because of the difficulty in using a resin material in some of the components of such a linear motion guide unit, the use of a resin material in manufacturing a linear motion guide unit has been rather limited. For example, there has been proposed to fabricate a slider or a part thereof from a resin material; however, there has nor been proposed to fabricate a rail of a linear motion guide unit from a resin material. Since the rail can be a dominant factor in determining the overall weight of such a linear motion guide unit, it is crucial that such a rail can be fabricated from a resin material in really making a light weight unit. In addition, if the entire or major portion of such a linear motion guide unit can be manufactured from a resin material, its manufacture can be extremely facilitated, which could also contribute to lower the manufacturing cost.

In a typical prior art linear motion guide unit, since most of its components are fabricated from a metallic material, such as steel, the overall weight has to become relatively large and separate fastening means, such as bolts or rivets, must be used to assemble the unit. Thus, the manufacture of such a prior art linear motion guide unit tends to be complicated and thus high in cost. In addition, such a typical prior art linear motion guide unit manufactured from a metallic material tends to be limited in applications since it necessarily creates noises and requires lubrication. Moreover, such a prior art unit cannot be used in some corrosive or magnetic environment.

SUMMARY OF THE INVENTION

In accordance with the present invention, there is provided a linear motion guide unit which includes a rail extending straight over a desired length and formed with first guiding means, a slider slidably mounted on said rail and formed with second guiding means opposite to said first guiding means and a plurality of rolling members interposed between said first and second guiding means to thereby provide a rolling contact between said rail and said slider, wherein at least one of said rail and slider is fabricated from a resin material.

In the preferred embodiment, the rail is fabricated from a resin material and has a pair of opposite side surfaces, each of which is formed with a first guide groove extending straight in parallel with the longitudinal axis of the rail. Each of the side surfaces is also formed with a plurality of vertical grooves spaced apart from each other. The vertical grooves allow the rail to have an increased flexibility in absorbing any error in the manufacture of the rail and/or in the mounting accuracy. The slider has has a generally U-shaped cross section and thus has a top horizontal section and a pair of vertical sections, each of which depends from a corresponding side of the top horizontal sections. Each of the vertical section of the slider has an inner side surface which is located opposite to the corresponding side surface of the rail and which is formed with a second guide groove extending in parallel with the associated first guide groove. Thus, a load path section is defined by a space between these associated first and second guide grooves. Preferably, the slider is formed with a pair of endless paths, each of which includes the load path section as its part and is filled with a plurality of rolling members, such as balls.

Preferably, the slider is also fabricated from a resin material. The inner surface of the vertical section of the slider is preferably formed with a plurality of vertical grooves spaced apart from each other. The slider preferably has a three-part structure, including a center block and a pair of end blocks which are located at the opposite ends of the center block. Preferably, the slider is formed with a pair of endless paths, each of which includes the load path section, a return path section, and a pair of curved connecting path sections, each connecting the corresponding ends of the load and return path sections. And, in the preferred embodiment, the center block is formed with the load path sections or second guide groove and the return path sections, and each of the end blocks is substantially formed with to curved connecting path sections. Preferably, at least one projection is formed at the contact surface of one of the center and end blocks and an associated hole is formed at the contact surface of the other of the center and end blocks. Thus, the center and end blocks can be assembled simply by having the projection fitted in to the associated hole. The projection and the hole may be so shaped that the center and end blocks can be held together once the projection is snugly fitted into the associated hole.

It is therefore a primary object of the present invention to provide an improved linear motion guide unit which can be extremely light in weight and/or compact in size.

Another object of the present invention is to provide an improved linear motion guide unit, at least a major portion of which is manufactured from a resin material, and, thus, easy to manufacture and low in cost.

A further object of the present invention is to provide an improved linear motion guide unit having an expanded range of applications and capable of being used even in hostile environments, such as corrosive or magnetic environment.

A still further object or the present invention is to provide an improved linear motion guide unit, requiring no lubrication, low in noise and flexible in mounting.

Other objects, advantages and novel features of the present invention will become apparent from the following detailed description of the invention when considered in conjunction with the accompanying drawings.

BRIEF DESCRIPTION OF THE DRAWINGS

FIG. 8 is a schematic illustration showing a modified structure of the projection shown in FIG. 7a.

DESCRIPTION OF THE PREFERRED EMBODIMENT

Figure 2:
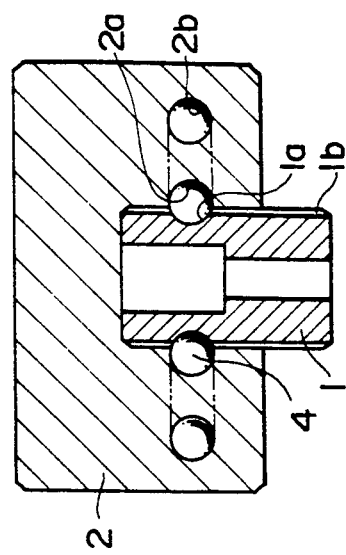
FIG. 2 is a schematic illustration showing in transverse cross section the linear motion guide unit of FIG. 1.
Figure 1:
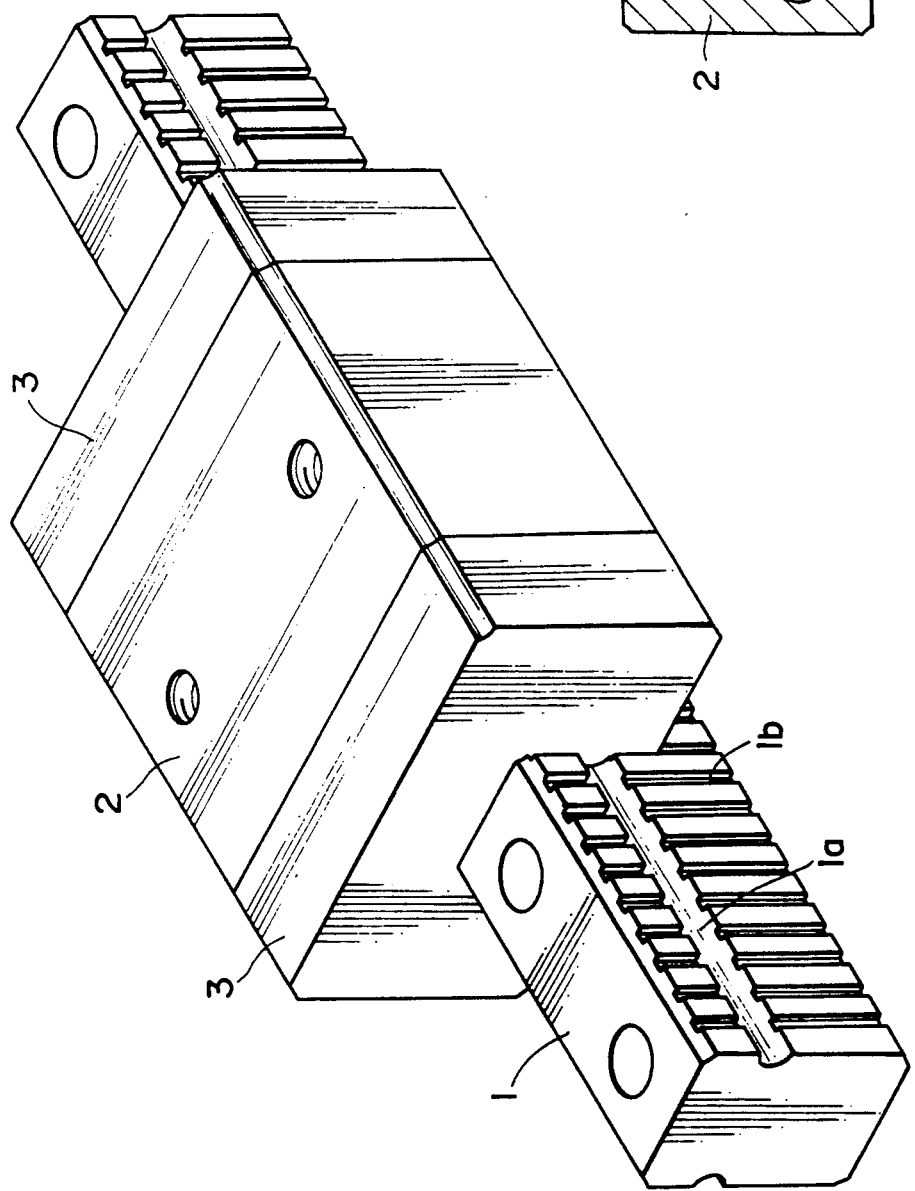
FIG. 1 is a schematic illustration showing in perspective view a linear motion guide unit constructed in accordance with one embodiment of the present invention.

Referring now to FIGS. 1 and 2, there is schematically shown a linear motion guide unit constructed in accordance with one embodiment of the present invention. As shown, the present linear motion guide unit includes a rail 1 which extends straight over a desired length. In the illustrated embodiment, the rail 1 has a generally rectangular cross section and thus a top surface, a pair of side surfaces and a bottom surface. In the illustrated embodiment, the side surfaces are vertical surfaces. A first guide groove 1a is formed on each of the side surfaces of the rail 1, extending straight in parallel with the longitudinal axis of the rail 1. Of importance, the rail 1 is also provided with a plurality of vertical grooves 1b spaced apart from each other at each of its side surfaces. In the illustrated embodiment, the vertical grooves 1b are arranged at a predetermined pitch, and each of the vertical grooves 1b extends straight vertically from the edge of the top surface to the edge of the bottom surface. In this embodiment, the rail 1 is fabricated from a resin material, in particular engineering plastics, such as PEEK, PES, PPS, PI, PAI, PPO and PEI. When the rail 1 is made from a resin material, the provision of such vertical grooves 1b is important because they provide flexibility to the rail 1 so that the rail 1 can absorb errors in the mounting accuracy. In addition, the provision of such vertical grooves 1b also allows to obtain a straight rail when manufactured from a resin material. Without such vertical grooves 1b, the rail 1 may be curved sideways when molded from a resin material. Such disadvantages can be avoided by the provision of such vertical grooves 1b.

In the illustrated embodiment, a plurality of vertical center holes are provided in the rail 1, each of which holes extends through the rail 1 at its center. These holes may be used for mounting the rail 1 on a desired object.

The present linear motion guide unit also includes a slider 2-3 which in the illustrated embodiment has a three-part structure, including a center block 2 and a pair of end blocks 3 located on both ends of the center block 2. As best shown in FIG. 2, the slider 2-3 has a generally U-shaped cross section and thus it includes integrally a top horizontal section and a pair of vertical sections, each of which depends downward from the corresponding side of the top horizontal section. Each of the vertical sections of the slider 2-3 has an inner side surface which is located opposite to an associated one of the side surfaces of the rail 1 with a predetermined gap therebetween when assembled. And, a second guide groove 2a is formed in this inner guide surface in an opposed relationship with the corresponding first guide groove 1a of the rail 1. Thus, the space between these first and second guide grooves 1a and 2a defines a load path section of an endless circulating path.

That is, in the embodiment shown in FIGS. 1 and 2, the slider 2-3 is provided with a pair of endless circulating paths, each provided in a corresponding one of its vertical sections. The endless circulating path includes a load path section, which is defined as a space between the first and second guide grooves 1a and 2a, a return path section 2b, which extends in parallel with the load path section, and a pair of curved connecting sections, each connecting the corresponding ends of the load and return path sections. And, a plurality of rolling members, or balls 4 in the illustrated embodiment, are provided in the endless circulating paths. Accordingly, those balls 4 located in the load path sections provide a rolling contact between the rail 1 and the slider 2-3 so that the slider 2-3 can move linearly along the rail 1 in either direction as long as the rail 1 extends since such a structure basically provides an indefinite relative motion between the slider 2-3 and the rail 1. The balls 4 may be made from any desired material, such as plastics, stainless steel, glass or ceramics.

As described before, the rail 1 is fabricated from a resin material. In the illustrated embodiment, preferably, the slider 2-3 is also fabricated from a resin material, which can be the same material as that of the rail 1 or can be a different material. However, the slider 2-3 is also preferably fabricated from an engineering plastic material and selection is preferably made from the group of the engineering plastic materials listed for the rail 1. When the slider 2-3 is made from such a resin material, the inner side surface of each of the vertical sections is formed with a plurality of vertical grooves similar to those 1b shown for the rail 1 in FIG. 1.

Figure 3:
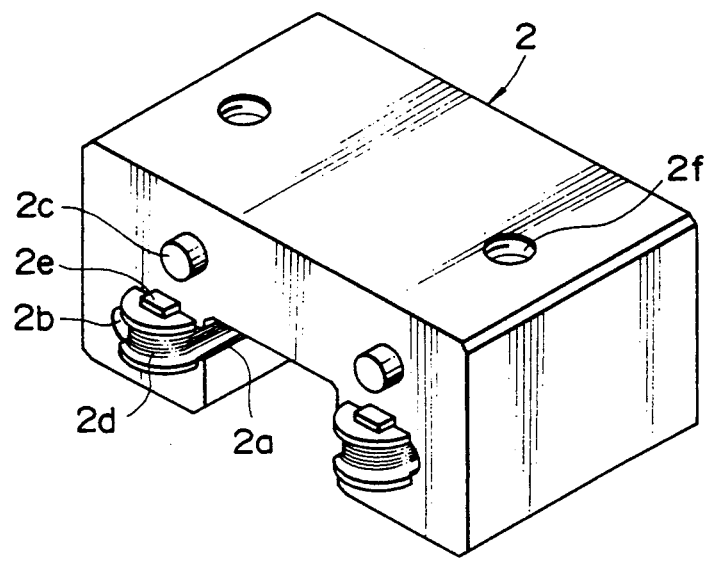
FIGS. 3 and 4 are schematic illustrations showing in perspective view one embodiment of the three-part slider applicable to the linear motion guide unit shown in FIGS. 1 and 2.
Figure 4:
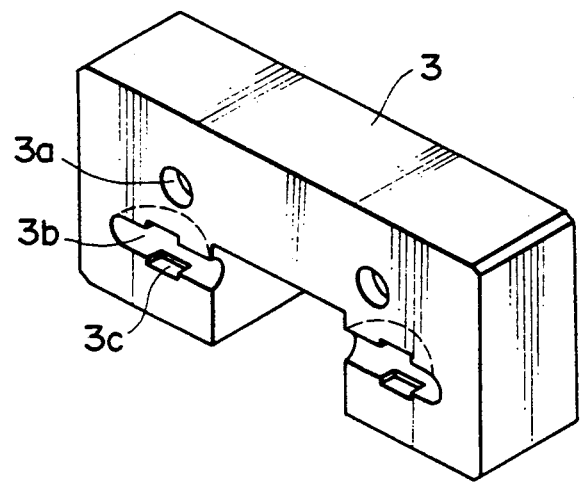

FIGS. 3 and 4 illustrate one example of the three-part structure of the slider 2-3. As shown in FIG. 3, the center block 2 of the slider 2-3 is formed with the second guide grooves 2a and their associated return path sections 2b. The center block 2 of this embodiment is also formed with saddle-shaped projections 2d, each of which defines an inner side surface of each of the curved connecting path sections of the endless circulating path. A positioning pawl 2e is integrally formed at the top and bottom surfaces of each of the saddle-shaped projections 2d. Also formed is a pair of connector projections 2c at each end surface of the center block 2. The center block 2 is also provided with a pair of threaded holes 2f at its top surface, which may be used to have the center block 2 and thus the slider 2-3 mounted to any desired object.

On the other hand, the associated end block 3 shown in FIG. 4 is formed with a pair of semi-circular cut-away portions 3b at its end surface to be brought into contact with the end surface of the center block 2. A recess 3c is formed at the top and bottom surfaces of the semi-circular cut-away portion 3b, and the positioning pawl 2e is fitted into the corresponding recess 3c when the center and end blocks 2 and 3 are assembled, thereby locating the saddle-shaped projection 2d in position inside the corresponding semi-circular cut-away portion 3b to define a predetermined curved connecting path section through which the balls 4 may move rolling. The end block 3 is also formed with a pair of connector holes 3a into which the respective connector projections 2c may be snugly fitted to keep the center and end blocks 2 and 3 held together. Preferably, a combination of such a connector projection 2c and a connector hole 3a is defined as a snap-fit connector combination. Thus, the end block 3 can be assembled to the center block 2 simply by having the connector projections 2c snap-fitted into the respective connector holes 3a. In such a structure, the center and end blocks 2 and 3 can be manufactured from a desired resin material, for example, by molding, such as injection molding, and these center and end blocks 2 and 3 may be simply put together by having respective projections fitted into the associated holes are recesses. Thus, the manufacture is extremely simple and low at cost.

Figure 5:
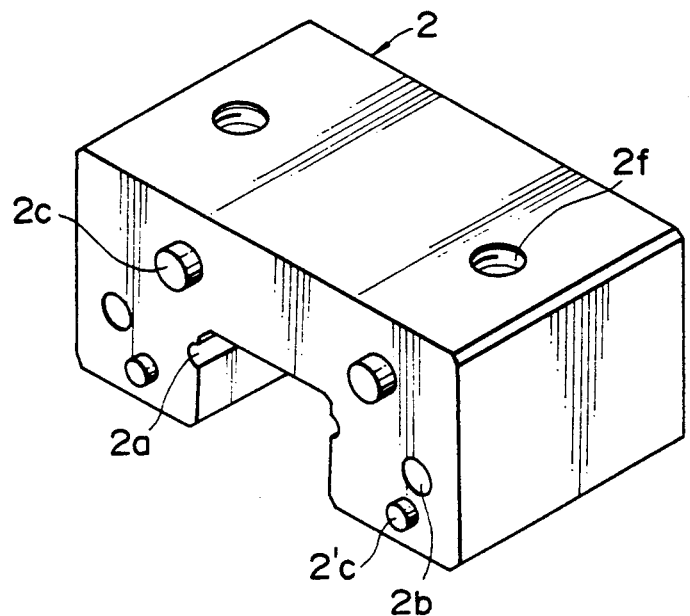
FIGS. 5 and 6 are schematic illustrations showing in perspective view another embodiment of the three-part slider applicable to the linear motion guide unit shown in FIGS. 1 and 2.
Figure 6:
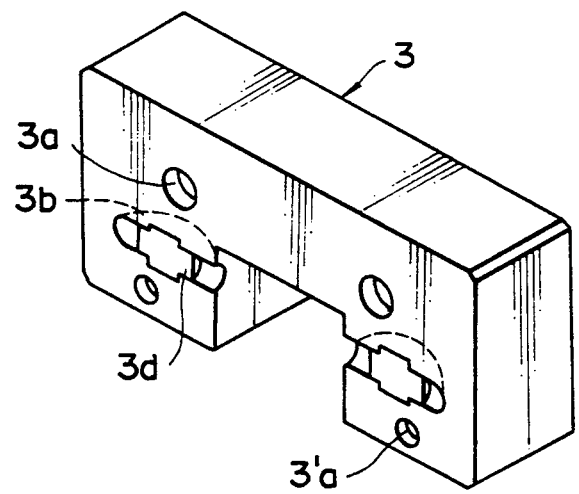

FIGS. 5 and 6 illustrate another example of the three-part slider 2-3 which can be advantageously used in the linear motion guide unit shown in FIGS. 1 and 2. This embodiment is basically the same in structure as that shown in FIGS. 3 and 4 excepting the fact that now a spacer member 3d is fixedly provided in each of the semi-circular cut-away portions 3b to define each of the curved connecting path sections in the end block 3 completely. Thus, there is no saddle-shaped projection at the end surface of the center block 2. In this embodiment, an additional pair of connector projections 2'c is provided at the end surface of the center block 2 as shown in FIG. 5 and an associated additional pair of connector holes 3'a is provided in the end surface of the end block 3 as shown in FIG. 6. These additional pairs of connector projections 2'c and holes 3'a also serve to position the center and end blocks 2 and 3 relative to each other when assembled. The center and end blocks 2 and 3 can also be manufactured in the same manner as described with reference to the embodiment shown in FIGS. 3 and 4.

Figure 7A:
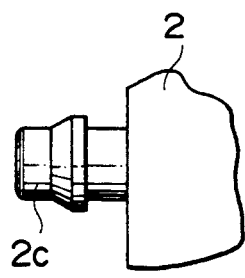
FIGS. 7a and 7b are schematic illustrations showing one example of snap fit structure between the center and end blocks of the slider in the linear motion guide unit shown in FIGS. 1 and 2.
Figure 7B:
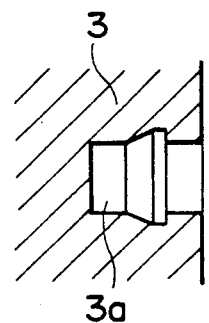

Now, referring to FIGS. 7a and 7b, there is schematically shown one embodiment of a snap-fit structure applicable to a combination of the connector projection 2c and the connector hole 3a. As shown in FIG. 7a, in this embodiment, the connector projection 2c includes a columnar section, which extends vertically from the end surface of the center block 2 and which has a predetermined diameter, and an intermediate flared-out section, which increases its diameter gradually from one end to the other and suddenly reduces its diameter to the original size. As shown in FIG. 7b, the connector hole 3a has a corresponding contour which is commensurate with the outer shape of the connector projection 2c. Thus, when the connector projection 2c is pushed into the associated connector hole 3a until the intermediate flared-out section becomes engated with an intermediate flared-out section of the hole 3a, the center and end blocks 2 and 3 are held together as a unit. Since the center and end blocks 2 and 3 are made from a resin material, the connector projection 2c and the connector hole 3a are both elastically deformable so that such a snap-fit structure is quite advantageous in putting the center and end blocks 2 and 3 together to define the slider 2-3.

Figure 8:
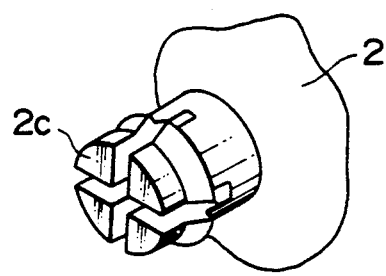

FIG. 8 illustrates a modified structure of the connector projection 2c. In this modified structure, an end cut in the form of a cross is provided at the top end of the connector projection 2c so as to provide an increased elasticity to the connector projection 2c. With such a structure, the insertion of the connector projection 2c into the associated connector hole 3a is significantly enhanced without reducing the integrity between the center and end blocks 2 and 3.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion guide unit, comprising:
   a rail extending straight over a desired length and formed with first guiding means;
   a slider slidably mounted on said rail and formed with second guiding means opposite to said first guiding means; and
   a plurality of rolling members interposed between said first and second guiding means to thereby provide a rolling contact between said rail and said slider;
   wherein at least one of said rail and slider is fabricated from a resin material and a plurality of vertical grooves spaced apart from each other are formed along said first and/or second guiding means.

2. The unit of claim 1, wherein said slider is provided with at least one endless circulating path which includes a load path section, a return path section and a pair of curved connecting path sections, each connecting corresponding ends of said load and return path sections, wherein said load path section is defined by a space between said first and second guiding means.

3. The unit of claim 2, wherein said rail has a pair of opposite side surfaces and said first guiding means includes a first guide groove formed in each of said pair of opposite side surfaces extending in parallel with a longitudinal axis of said rail.

4. The unit of claim 3, wherein said slider includes integrally a horizontal top section and a pair of vertical sections, each depending from a corresponding side of said horizontal top section, so that said slider has a generally U-shaped cross section, each of said vertical sections having an inner side surface located opposite to a corresponding side surface of said rail with a predetermined gap therebetween, and said second guiding means includes a second guide groove formed in said inner side surface extending along the longitudinal axis of said rail.

5. The unit of claim 3, wherein said plurality of vertical grooves are formed in each of said pair of side surfaces.

6. The unit of claim 1, wherein said slider has a three-part structure including: a center block and a pair of end blocks located on opposite ends of said center block.

7. The unit of claim 6, wherein said slider includes holding means for holding each of said end blocks to said center block as connected integrally.

8. The unit of claim 7, wherein said holding means includes a connector projection integrally formed at an end surface of either of said center and end blocks and a connector hole formed in an end surface of the other of said center and end blocks.

9. The unit of claim 8, wherein said holding means has a snap fit structure such that said connector projection may be snap-fitted into said connector hole.

10. The unit of claim 6, wherein said center block is formed with said second guide groove and said return path section and said end block is formed with said curved connecting path section.

11. The unit of claim 1, wherein said resin material is an engineering plastic material.

12. The unit of claim 11, wherein said engineering plastic material is selected from the group consisting of PEEK, PES, PPS, PI, PAI, PPO and PEI.

13. The unit of claim 1, wherein said plurality of rolling members are balls.

14. The unit of claim 1, wherein said plurality of rolling members comprise a material selected from the group consisting of plastics, stainless steel, glass and ceramics.

* * * * *